United States Patent [19]

Erme et al.

[11] Patent Number: 4,523,845
[45] Date of Patent: Jun. 18, 1985

[54] DOUBLE GRATING MONOCHROMATOR

[75] Inventors: Enn K. Erme; Tiit P. Lepasaar, both of Tartu; Jury E. Ummer, Tallin; Rein A. Kink, Tartu, all of U.S.S.R.

[73] Assignee: Institut Fiziki Akademii Nauk Estonskoi SSR, Tartu, U.S.S.R.

[21] Appl. No.: 464,785

[22] Filed: Feb. 9, 1983

[30] Foreign Application Priority Data

May 14, 1982 [SU] U.S.S.R. .............................. 3437401

[51] Int. Cl.$^3$ .............................................. G01J 3/18
[52] U.S. Cl. .................................................. 356/333
[58] Field of Search ............................... 356/333, 334

[56] References Cited

U.S. PATENT DOCUMENTS

| 3,695,764 | 10/1972 | Delmas et al. | 356/334 X |
| 3,730,626 | 5/1973 | Cruvellier et al. | 356/334 X |
| 3,868,499 | 2/1975 | Aaronson et al. | 356/334 X |
| 4,211,486 | 7/1980 | Magnussen, Jr. et al. | 356/334 X |

FOREIGN PATENT DOCUMENTS 600401  3/1978  U.S.S.R. .

OTHER PUBLICATIONS

"Vestnik Leningradskogo Universiteta", No. 3, 1973, pp. 56–60.

Primary Examiner—F. L. Evans
Attorney, Agent, or Firm—Lilling & Greenspan

[57] ABSTRACT

In a double grating monochromator, the scanner comprises a programming device specifying the angular positions of the diffraction gratings, as the radiation spectrum is scanned, so that the angles of radiation incident thereon are related by $$\frac{\sigma_1 |(\text{Sin } \alpha_1 + \text{Sin } \beta_1)|}{|K|} = \frac{\sigma_2 |(\text{Sin } \alpha_2 + \text{Sin } \beta_2)|}{|K| + 1}$$

where $\sigma_1$, $\alpha_1$, and $\beta_1$ are: constant of one of the diffraction gratings, angle of radiation incident on this grating, and angle of radiation diffracted from this grating, respectively; $\sigma_2$, $\alpha_2$, and $\beta_2$ are: constant of the other diffraction grating, angle of radiation incident on this grating, and angle of radiation diffracted from this grating, respectively; and "K" is spectral order of radiation diffracted from one of the diffraction gratings and extracted by this slit positioned immediately after this grating, the value of "K" being determined by the working portion of the monochromator spectrum. The scanner also comprises two electric motors, each kinematically coupled with one of the diffraction gratings, pickups sensing the angular position of the diffraction gratings, two comparators, the inputs of each being connected to one of the outputs of the programming device and to the respective pickup, and two controllers, the input of each being connected to the output of one of the comparator and the output thereof, to the control input of the respective electric motor.

1 Claim, 2 Drawing Figures

DOUBLE GRATING MONOCHROMATOR

BACKGROUND OF THE INVENTION

1. Field of the Invention

The present invention relates to spectral devices, and more particularly to double grating monochromators. The invention can be utilized in the laboratory for making a variety of spectroscopic investigations requiring a high resolution or an increased aperture ratio, with a low-level scattered radiation.

2. Description of the Prior Art

One known double grating monochromator (cf. USSR Inventor's Certificate No. 600401, published in 1978) comprises fixed slits, viz. an entrance, an intermediate, and an exit slit, a pair of diffraction gratings disposed on one rotatable mount connected to a scanning device, and a set of mirrors to change the direction of the light flux passing through the monochromator.

In this monochromator, the slits after each of the diffraction gratings are positioned so as to extract radiation of the first spectral order. It imposes limitations on the resolution of the monochromator or on its aperture ratio for a given resolution. On the other hand, the extraction of higher-order radiation in said monochromator results in a narrower free spectral region which in turn restricts the overall spectral region of the monochromator. As is well known, the free spectral region $\Delta\lambda$ is given by $$\Delta\lambda = \lambda_1/K \tag{1}$$

where $\lambda_1$ is lower bound of the spectral region, and
$K$ is spectral order of radiation.

The above expression shows, that the higher the order of the radiation spectrum, the narrower is the free spectral region.

In order to overcome this drawback, it is theoretically possible that filters be employed to cut off radiation of unwanted spectral orders, but such filters find limited practical application, particularly in vacuum ultraviolet radiation region.

Also the aforementioned monochromator has a relatively low aperture ratio due to a great number of reflecting surfaces present in the structure. It is particularly critical in the vacuum UV radiation region, wherein the reflection ratio is not in excess of 0.5 (in the visible region, in fact, the reflection ratio is as high as 0.85).

Also known in the prior art is a double grating monochromator (cf. "Vestnik leningradskogo universiteta", Leningrad, 1973, No. 10, pp. 57-58, FIG. 1) comprising an entrance slit, a first diffraction grating, an intermediate slit, a second diffraction grating, and an exit slit all arranged in series along the propagation path of radiation and optically interconnected. As the radiation spectrum is scanned, the diffraction gratings are rotated by a scanning device mechanically connected with one of the diffraction gratings. Synchronous rotation of the other diffraction grating is accomplished by a lever mechanism linked with the mechanical transmission.

Both the halves of this monochromator also extract radiation of the first spectral order and exhibit identical parameters of the optical system, causing both gratings to be rotated through the same angle as the spectrum is scanned.

Compared to the monochromator as disclosed in the USSR Inventor's Certificate mentioned hereinabove, this monochromator provides a better aperture ratio owing to the fact that the number of reflecting surfaces is here minimized as a result of absence of the mirror array. Since this monochromator, however, also deals with the first spectral order radiation alone, it suffers from all the above disadvantages, namely: low resolution or low aperture ratio for a given resolution. The spectral region is further limited by the grating efficiency being reduced, as the angles of radiation incident on the gratings are removed, in the process of scanning, from a value corresponding to the grating positions that provide for the maximum power concentration of the outgoing radiation within the first spectral order ("blaze" effect). Moreover, when a lever mechanism is used in the scanning device, eventual plays as well as temperature and vibration effects prevent a sufficiently timed rotation of the diffraction gratings, resulting in a reduced accuracy of the monochromator unit.

SUMMARY OF THE INVENTION

It is an object of the present invention to increase resolution of a double grating monochromator, while maintaining a spectral region free from being overlapped by other spectral orders.

It is another object of the invention to provide a wider spectral region of a double grating monochromator.

A further object of the invention is to provide an increased accuracy of the double grating monochromator.

It is still another object of the invention to provide a double grating monochromator such as to allow extraction of radiation of different spectral orders, after diffraction effected by means of diffraction gratings.

With these and other objects in view, there is provided a double grating monochromator comprising an entrance slit, a first diffraction grating, an intermediate slit, a second diffraction grating, and an exit slit all arranged in series along the propagation path and optically coupled, and a scanning device that serves to measure angular positions of the diffraction gratings, as the radiation spectrum is scanned, the scanning device being equipped with an electric motor kinematically coupled with one of the diffraction gratings, wherein, according to the invention, the scanning device further comprises another electric motor kinematically coupled with the other diffraction grating, an angular position pickup for sensing the position of the first diffraction grating, an angular position pickup for sensing the position of the second diffraction grating, a programming device for generation of signals defining the angular positions of the diffraction gratings, in the process of scanning, so that the angles of radiation incident on the diffraction gratings are related by $$\frac{\sigma_1|(\sin\alpha_1 + \sin\beta_1)|}{|K|} = \frac{\sigma_2|(\sin\alpha_2 + \sin\beta_2)|}{|K| + 1} \tag{2}$$

where $\sigma_1, \alpha_1$ and $\beta_1$ are constant of one of the diffraction gratings, angle of radiation incident on this grating, and angle of radiation diffracted from this grating, respectively, $\sigma_2, \alpha_2$ and $\beta_2$ are constant of the other of the diffraction gratings, angle of radiation incident on this grating, and angle of radiation diffracted from this grating, respectively, K is spectral order of radiation diffracted by one of the diffraction gratings and extracted by the slit disposed immediately after this grating, the value of "K" being determined by the working portion of the spectral region of the monochromator, two comparators for generation of signals corresponding to the signal difference at their two inputs, one input of each comparator being connected to one of the outputs of the programming device, the other input thereof being connected to the output of the angular position pickup of the respective diffraction grating, and two controllers having each their inputs connected to the output of one of the comparators, and their outputs to the control input of the respective electric motor.

An increased resolution provided in the proposed monochromator, while maintaining a free spectral region, is obtained by extracting radiation of varying spectral orders as a result of appropriate positioning of the diffraction gratings, as the spectrum is scanned. In this case, an expanded spectral region of the monochromator is provided by partitioning the overall spectral region into a number of subregions, the monochromator operating in each of them so as to radiate spectral orders differing from those existing in other subregions, as will be illustrated by the detailed description of the invention. So in each spectral region, the monochromator operates close to an area providing the effect of "Blaze", i.e. in the most efficient region of the diffraction gratings.

The accuracy of the proposed monochromator is improved by virtue of more accurate alignment of angular positions of the diffraction gratings, in the process of scanning the spectrum, which is provided by employing individual drives for rotation of diffraction gratings and by specifying the grating rotation angles using the programming device, as well as by accounting for the actual positions of the gratings sensed by the pickups.

BRIEF DESCRIPTION OF THE DRAWINGS

These and other objects and advantages of the present invention will be more apparent from the following detailed description of its preferred embodiment taken in conjunction with the accompanying drawings, wherein.

DESCRIPTION OF THE PREFERRED EMBODIMENT

Figure 1:
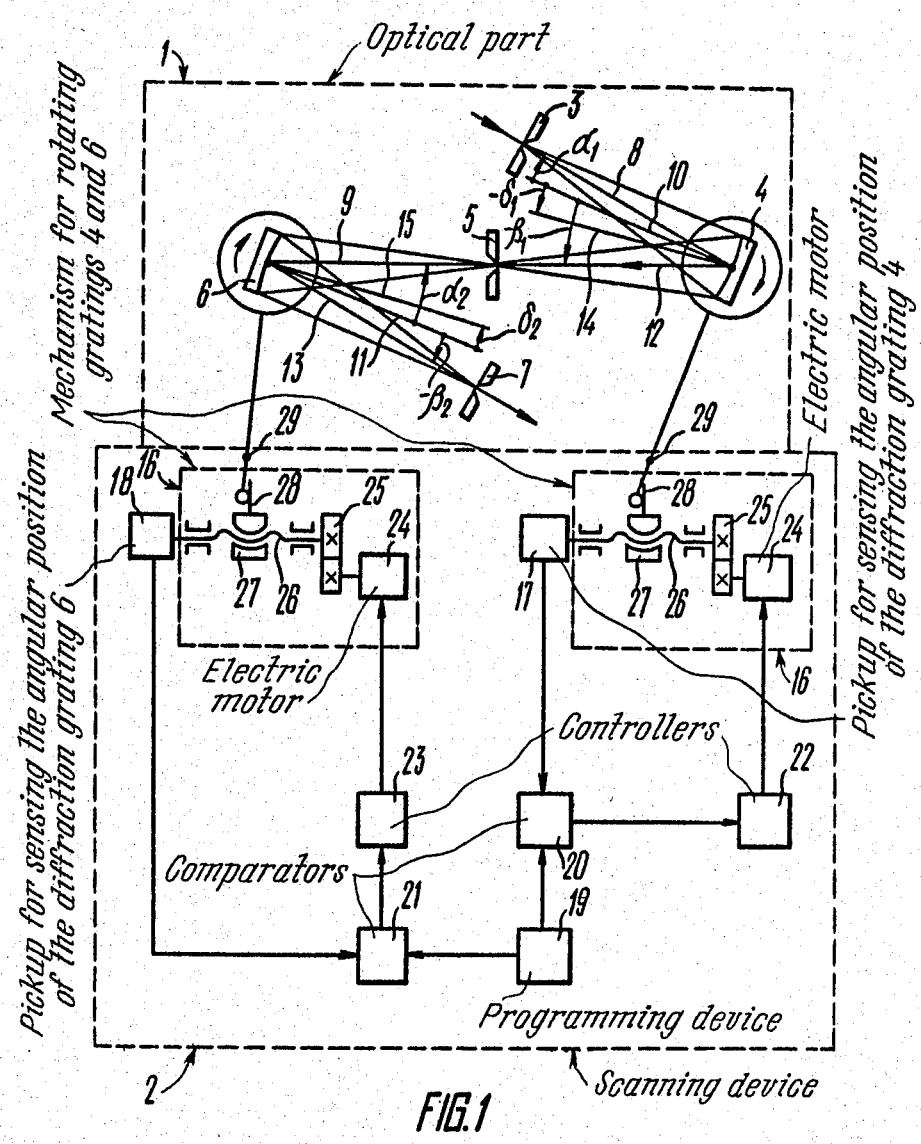
FIG. 1 represents a schematic diagram of a double grating monochromator, according to the invention.

The double grating monochromator according to the invention comprises an optical part 1 (FIG. 1) and a scanning device 2. The optical part 1 of the monochromator includes an entrance slit 3, a first concave diffraction grating 4, an intermediate slit 5, a second concave diffraction grating 6, and an exit slit 7, all optically coupled and arranged in series along the propagation path. To make the monochromator scan the radiation spectrum, the diffraction gratings 4 and 6 are mounted for rotation about axes passing through their centres and parallel to their rulings, and in each working position of the spectrum scanned, the diffraction gratings 4 and 6 are arranged with respect to the incident radiation so that the following relation is met:

$$\frac{\sigma_1|(\sin\alpha_1 + \sin\beta_1)|}{|K|} = \frac{\sigma_2|(\sin\alpha_2 + \sin\beta_2)|}{|K| + 1} \quad (2)$$

where $\sigma_1$ is constant of one of the diffraction gratings such as grating 4, $\alpha_1$: angle of radiation incident on grating 4

$\beta_1$: angle of radiation diffracted from grating 4

$\sigma_2$: constant of the other diffraction grating such as grating 6, $\alpha_2$: angle of radiation incident on grating 6, $\beta_2$: angle of radiation diffracted from grating 6, and K: spectral order of radiation diffracted by the grating 4 and extracted by the slit 5 disposed immediately after this grating.

The selection of "K" value for the specific working portion of the monochromator spectrum is described hereinbelow.

It is evident, that the symbols with subscript "1" contained in expression (2) may correspond to parameters associated with the grating 6, and the symbols with subscript "2" to parameters associated with the grating 4, for it is of no importance, which half of the optical part I of the monochromator handles radiation of the higher spectral order.

The angles $\alpha_1, \beta_1, \alpha_2$, and $\beta_2$ are shown in FIG. 1. Here the reference numerals 8 and 9 denote central beams incident on the diffraction gratings 4 and 6, respectively; shown at 10 and 11 are normals to the gratings 4 and 6, respectively, at their centres; shown at 12 and 13 are central beams diffracted from the gratings 4 and 6, respectively; and, finally, shown at 14 and 15 are bisectrices of the angles between the beams 8, 12 and the beams 9, 13, respectively.

The scanning device 2 causing the angular position of the diffraction gratings 4 and 6 to be varied, as the spectrum is scanned, comprises two identical mechanisms 16 for rotating the gratings 4 and 6, a pickup 17 for sensing the angular position of the diffraction grating 4, a pickup 18 for sensing the angular position of the grating 6, a programming device 19, comparators 20 and 21, and controllers 22, 23. The diffraction grating rotation mechanisms 16 comprise each an electric motor 24 with a mechanical transmission that, in this particular embodiment of the invention, consists of a reduction gear 25, a screw-type mechanism formed by a screw 26 and a nut 27, and a sine mechanism including a pusher 28 and a lever 29. The screw 26 of the screw-type mechanism is connected with the output shaft of the reduction gear 25, and the pusher 28 of the sine mechanism is rigidly secured to the nut 27 of the screw-type mechanism. The diffraction grating 4 or 6 is attached to the lever 29 of the sine mechanism, the axis of rotation of the lever 29 passing through the centre of the respective grating 4 or 6, parallel to its rulings.

The pickups 17 and 18 may be in the form of a coding device, such as the "angle-to-digit" encoder. In this embodiment of the monochromator, the pickups 17 and 18 are mounted each on the screw 26 of the screw-type mechanism for rotation of the respective diffraction grating. The pickups 17 and 18, however, may be directly connected to the diffraction gratings 4 and 6, respectively, or else they may be coupled with other elements of the mechanical transmission of the respective rotation mechanism.

The programming device serves to generate electric signals for controlling the positions of the diffraction gratings 4 and 6, as the spectrum is scanned, following the relationship (2). For example, it may be formed by a microprocessor device including a storage used to enter the function (2) and the working program of the monochromator, and an operational unit for generation of signals for the comparators 20 and 21. The first output of the programming device 19 generating a signal that defines the angular position of the diffraction grating 4 is connected to the first input of the comparator 20, the second input thereof being connected to the position pickup 17 of the grating 4. The second output of the programming device 19 generating a signal that defines the angular position of the diffraction grating 6 is connected to the first input of the comparator 21 with the second input thereof connected to the position pickup 18 of the diffraction grating 6. The output of the comparator 20 is connected to the input of the controller 22, the output thereof being connected to the control input of the electric motor 24 kinematically coupled with the diffraction grating 4. The output of the comparator 21 is connected to the input of the controller 23, the output thereof being connected to the control input of the electric motor 24 kinematically coupled with the diffraction grating 6.

The operation of the proposed monochromator now follows.

First, the initial positions of the diffraction gratings 4 and 6 selected according to the wavelength range of the radiation to be investigated. The initial values of the angles $\alpha_1$ and $\alpha_2$ of radiation incident on the diffraction gratings 4 and 6, respectively, are determined by the programming device 19. A working program of the monochromator is previously entered into the storage of the programming device, this program implementing the function (2) and defining the rate, range, and sequence of scanning, the spectral orders of radiation extracted after the diffraction gratings 4 and 6, etc. The programming device 19 generates electrical signals setting the initial values of the angles $\alpha_1$ and $\alpha_2$ of radiation incident on the diffraction gratings 4 and 6, these signals are applied to the first inputs of the comparators 20 and 21, the other inputs thereof being supplied with signals from the pickups 17, 18, respectively, that characterize the actual position of the diffraction gratings 4 and 6, respectively. The comparators 20 and 21 generate each an electric signal corresponding to (for example, in proportion to) the difference in their inputs and necessary for rotating the gratings 4 and 6, until the specified initial values of angles $\alpha_1$ and $\alpha_2$ are reached. The signals from the comparators 20 and 21 are converted e.g. amplified, phase-split, etc.) by the controllers 22 and 23, respectively, and applied to the electric motors 24 which, as they rotate, turn the diffraction gratings 4 and 6, via the reduction gears 25, the screw-type transmissions, and the sine mechanisms. In so doing, the outputs of the pickups 17 and 18, respectively, are changed, and when the signals of the pickups 17, 18 become equal to the signals coming from the respective outputs of the programming device 19, the gratings 4 and 6 stop rotating, i.e. they come to be positioned in the required initial points.

Figure 2:
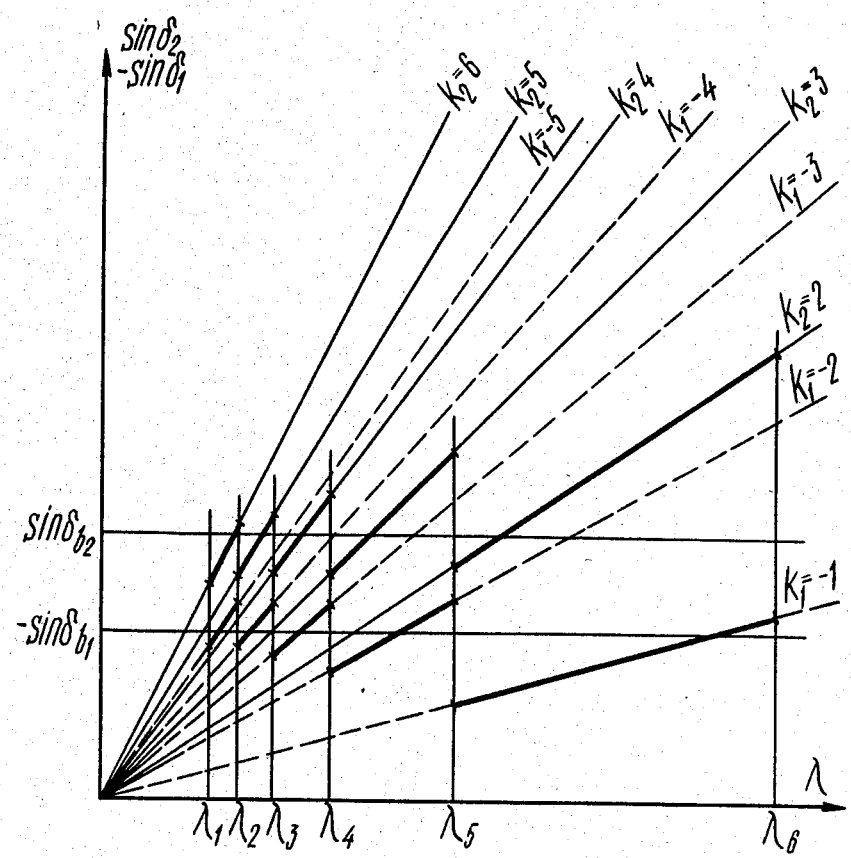
FIG. 2 is a plot demonstrating sets of spectral orders of radiation in the monochromator of FIG. 1, as selected according to the working portion of its spectral region.

Selected combinations of spectral orders of radiation, introduced into the program of the programming device 19 are illustrated in FIG. 2, wherein the sines of rotation angles of the diffraction gratings are plotted against, the radiation wavelength, for different spectral orders of radiation. The following notation is used in FIG. 2:

$\lambda$ = radiation wavelength $\delta_1$ = angle of rotation of one of the diffraction gratings, such as grating 4, from a position corresponding to the zero spectral order of radiation, i.e. the angle between the normal 10 and the bisectrix 14 of FIG. 1, $\delta_2$ = angle of rotation of the other diffraction grating, such as grating 6, from a position corresponding to the zero spectral order of radiation, i.e. the angle between the normal 11 and the bisectrix 15 of FIG. 15, $\delta_{b1}$ and $\delta_{b2}$ = values of angles $\delta_1$ and $\delta_2$, respectively, such that the "blaze" effect occurs, i.e. the highest efficiency of the diffraction gratings is achieved, and $K_1$ and $K_2$ = spectral orders of radiation diffracted by the respective diffraction gratings.

It will be seen from FIG. 2, that the overall spectral region $\lambda_1 \div \lambda_6$ of the monochromator can be divided into several subregions $\lambda_1 \div \lambda_2, \ldots \lambda_5 \div \lambda_6$ including each a pair of spectral orders $K_1$ and $K_2$ such that the angles $\delta_1$ and $\delta_2$ of rotation of the diffraction gratings are caused to be positioned near the values $\delta_{b1}$ and $\delta_{b2}$ defining the "blaze" effect, as indicated by heavy line sections, the spectral orders $K_1$ and $K_2$ of each such pair being related by $|K_2| - |K_1| + 1$. For example, if the radiation under test lies within the subregion $\lambda_4 \div \lambda_5$, it is preferable that the spectral orders $K_1 = -2$ and $K_2 = -3$ be used. The selection of spectral orders $K_1$ and $K_2$ for each subregion, with their magnitudes differing by one is due to the fact, that in this case, the region $\Delta\lambda$ free from being overlapped by other spectral orders is equal to the lower bound of the spectral region of the monochromator, i.e. it is not reduced compared to the free spectral region of the monochromator dealing with radiation of the first spectral order alone.

After setting the initial positions of the gratings 4 and 6, the monochromator is ready for operation. The radiation penetrates the monochromator through the entrance slit 3 and strikes the first diffraction grating 4, and the radiation diffracted therefrom in the spectral order $K_1$ is then focussed, in the meridian section, on the plane of the intermediate slit 5 which extracts monochromatic radiation. After the slit 5, the radiation strikes the second diffraction grating 6 and, being diffracted therefrom in the spectral order $K_2$, is focussed in the meridian section on the plane of the exit slit 7. The monochromatic radiation, after passing the slit 7, leaves the monochromator.

The wavelength scanning is performed by timed rotation of the gratings 4 and 6 about the axes parallel to their rulings and passing through their centres. In the process of scanning, the signals required for controlling the motor 24 are generated by means of the programming device 19 in a manner similar to that providing the initial positioning of the gratings 4 and 6. Now the outputs of the programming device 19 specifying the laws of time variation of the grating rotation angles $\delta_1$ and $\delta_2$, in accordance with the relationship (2), have different magnitudes, since the gratings 4 and 6 operate in different spectral orders, as mentioned above. It will be shown, that in order to satisfy the relation (2), it is necessary that the ratio of the angular velocities of rotating the gratings 4 and 6 be constant and equal to $|K_1|/|K_2|$ or, with $|K_2| = |K_1| + 1$, to $|K_1|/(|K_1| + 1)$.

The program in the programming device 19 may also account for additional factors, such as corrections of angular positions of the gratings 4 and 6, according to cacalibrating polynomials previously introduced into the storage of the programming device 19, to allow for systematic kinematic errors of the rotation mechanisms 16, etc.

The signals generated by the programming device 19 and defining the required current values of rotation angles $\delta_1$ and $\delta_2$ for the gratings 4 and 6 are applied to the first inputs of the comparators 20 and 21 comparing them to the values of actual angular positions of the gratings, as sensed by the pickups 17, 18, respectively. The comparators 20 and 21 apply the error signals to the controllers 22 and 23, respectively. The controllers 22 and 23 minimize the misalignment of the positions of the gratings 4 and 6, respectively, by causing the electric motors 24 to rotate until the gratings 4 and 6 have reached the positions specified by the programming device 19.

It will be noted, that the aforementioned specific embodiment of the invention is not restrictive with respective with respect to the type of the double monochromator. The proposed design of the double grating monochromator with a control system is also applicable to double monochromators with two plane diffraction gratings, using appropriate focusing optics such as the Czerny-Turner, Ebert-Fastie and other systems. Although these systems, when employed, lead to a complicated optical part of the monochromator as a result of adding extra reflecting surfaces, the relation between the grating rotation angles and radiation wavelength, according to selected spectral orders, is identical to that described hereinabove, and the scanning device is functionally similar to the aforementioned unit.

The proposed monochromator offers an increased resolution and an extended spectral region. This is provided by increasing angular dispersion due to extraction of different spectral orders of radiation in the two halves of the monochromator. For example, the double monochromator operating in the dispersion-addition mode and extracting radiation of the fifth and sixth spectral orders exhibits an angular dispersion eleven times as large as that of the known monochromator. It allows an average increase in resolution of the monochromator of one order of magnitude, the maximum resolution increase occurring in the shortwave spectral region.

An extended spectral region of the proposed monochromator is provided by its being capable of handling several pairs of spectral orders of radiation. For example, if the proposed monochromator employs pairs of spectral orders between 1,2 and 5,6, its spectral region lies within the wavelength band ranging from 62 nm to 267 nm, as shown by calculation results using conventional design principles, whereas the use of radiation of the first spectral order alone (which is the case with the known monochromators) the spectral region only extends from 62 nm to 186 nm.

Further, the electronic control of rotation of the diffraction gratings in the proposed monochromator provides a high scanning accuracy due to a smaller error of timing angular positions of the gratings, thereby ensuring a better accuracy of reading the wavelengths of radiation passing through the monochromator. In known monochromators, the angular position timing error is generally corrected by a wider intermediate slit (in dispersion-addition monochromators) or by a wider exit slit (in dispersion-subtraction monochromators), resulting in a higher level of spurious radiation from the monochromator, thus impairing the signal-to-noise ratio in spectroscopic measurements. In the proposed monochromator, an increased scanning accuracy permits a narrower intermediate (or exit) slit, thereby improving the performance of spectroscopic tests.

It is apparent, that other embodiments of the invention are possible, differing from the above but remaining within the scope defined by the following claims.

What is claimed is:

1. A double grating monochromator comprising an entrance slit, a first diffraction grating, an intermediate slit, a second diffraction grating, and an exit slit all optically coupled and arranged in series along a propagation path of the radiation, and a scanning device for varying the angular positions of said diffraction gratings, as the radiation spectrum is scanned, said scanning device comprising:
   a pickup sensing the angular position of said first diffraction grating,
   a pickup sensing the angular position of said second diffraction grating,
   a programming device having a first output and a second output, for generation of signals specifying the angular positions of said first and second diffraction gratings, as the radiation spectrum is scanned, so that the angles of radiation incident on said diffraction gratings are related by $$\frac{\sigma_1|(\text{Sin } \alpha_1 + \text{Sin } \beta_1)|}{|K|} = \frac{\sigma_2|(\text{Sin } \alpha_2 + \text{Sin } \beta_2)|}{|K| + 1}$$

where
   $\sigma_1, \alpha_1$, and $\beta_1$: constant of one of said diffraction gratings, angle of radiation incident on this grating, and angle of radiation diffracted from this grating, respectively,
   $\sigma_2, \alpha_2$, and $\beta_2$: constant of the other of said diffraction gratings, angle of radiation incident on this grating, and angle of radiation diffracted from this grating, respectively, and
   K: spectral order of radiation diffracted from one of said diffraction gratings and extracted by the slit located immediately after this grating, the value of "K" being determined by the working portion of the spectral region of the monochromator,
   a first comparator having a first input connected to said first output of said programming device, a second input connected to said pickup sensing the angular position of said first diffraction grating, and an output for generation of a signal corresponding to the difference between signals at its inputs,
   a second comparator having a first input connected to said second output of said programming device, a second input connected to said pickup sensing the angular position of said second diffraction grating, and an output for generation of a signal corresponding to the difference between the signals at its inputs,
   a first controller having an input connected to said output of said first comparator, and an output,
   a second controller having an input connected to said output of said second comparator, and an output,
   a first electric motor kinematically coupled with said first diffraction grating for positioning it as specified by the signal from said first output of said programming device, and having a control input connected to said output of said first controller, and a second electric motor kinematically coupled with said second diffraction grating for positioning it as specified by the signal from said second output of said programming device, and having a control input connected to said output of said second controller.

* * * * *